(12) United States Patent
Sarver

(10) Patent No.: US 11,864,504 B2
(45) Date of Patent: Jan. 9, 2024

(54) ETHERNET DECODER IRRIGATION CONTROL SYSTEM

(71) Applicant: Larry C. Sarver, Mars, PA (US)

(72) Inventor: Larry C. Sarver, Mars, PA (US)

( * ) Notice: Subject to any disclaimer, the term of this patent is extended or adjusted under 35 U.S.C. 154(b) by 206 days.

(21) Appl. No.: 17/153,562

(22) Filed: Jan. 20, 2021

(65) Prior Publication Data

US 2021/0137033 A1 May 13, 2021

Related U.S. Application Data

(62) Division of application No. 16/177,590, filed on Nov. 1, 2018, now Pat. No. 10,925,222.

(60) Provisional application No. 62/580,753, filed on Nov. 2, 2017, provisional application No. 62/580,685, filed on Nov. 2, 2017.

(51) Int. Cl.
| | |
|---|---|
| *A01G 25/16* | (2006.01) |
| *G05B 15/02* | (2006.01) |
| *H04W 88/00* | (2009.01) |
| *F16K 31/02* | (2006.01) |

(52) U.S. Cl.
CPC .............. *A01G 25/16* (2013.01); *F16K 31/02* (2013.01); *G05B 15/02* (2013.01); *H04W 88/00* (2013.01); *G05B 2219/2625* (2013.01)

(58) Field of Classification Search
CPC ...... A01G 25/16; A01G 25/165; A01G 25/02; A01G 27/003; G05B 2219/2625; G05B 19/042; G05B 2219/25132; G05B 19/0423; G05B 15/02; G05B 2219/25419; H04W 56/001; H04W 88/00; H04W 88/08; H04W 12/71; H04L 2012/2841; H04L 12/2803; H04L 12/2816; H04L 12/283; H04L 67/12; H04L 67/125; H04L 12/281; H04L 1/189

See application file for complete search history.

(56) References Cited

U.S. PATENT DOCUMENTS

| | | | |
|---|---|---|---|
| 3,983,895 A | 10/1976 | Pouska et al. | |
| 5,139,044 A | 8/1992 | Otten et al. | |
| 5,810,245 A * | 9/1998 | Heitman | .................. F24F 11/74 236/51 |
| 6,021,797 A | 2/2000 | Gaines | |
| 6,089,267 A | 7/2000 | Gaines | |
| 6,542,827 B1 | 4/2003 | Koster | |
| 8,024,075 B2 * | 9/2011 | Fekete | .................. G05B 15/02 239/69 |

(Continued)

*Primary Examiner* — Darrin D Dunn
(74) *Attorney, Agent, or Firm* — The Webb Law Firm

(57) ABSTRACT

In a flow system and method, a fluid delivery pipe is connected in series between a fluid distributor and a fluid valve that is connected in series between a fluid source and the fluid distributor. A controller, disposed remote from the fluid delivery pipe, can be programmed or configured to control the fluid value via a communication channel or communication network. A hydrogenerator, powered by fluid running from the fluid source to the fluid distributor, can charge a battery that can power a radio to wirelessly transmit flow data to the controller. The controller can control the open and close states of the fluid valve based on the wirelessly transmitted flow data received by the controller to control an amount of fluid delivered by the fluid delivery pipe, for example, for controlled irrigation of an area to a desired extent.

6 Claims, 4 Drawing Sheets

(56) References Cited

U.S. PATENT DOCUMENTS

| | | | | |
|---|---|---|---|---|
| 8,265,797 B2* | 9/2012 | Nickerson | ............ | A01G 25/165 239/69 |
| 8,615,329 B2* | 12/2013 | O'Connor | ............ | G05D 7/0664 700/285 |
| 8,676,219 B2* | 3/2014 | Pratt, Jr. | ............ | G01D 21/00 455/426.2 |
| 8,711,704 B2* | 4/2014 | Werb | ............ | H04L 9/083 455/448 |
| 8,756,412 B2* | 6/2014 | Pulini | ............ | H04L 63/20 370/401 |
| 8,909,381 B2* | 12/2014 | Crist | ............ | A01G 25/16 340/870.18 |
| 9,043,036 B2* | 5/2015 | Fekete | ............ | G05B 15/02 700/282 |
| 9,161,499 B2* | 10/2015 | Bailey | ............ | A01G 25/167 |
| 9,166,812 B2* | 10/2015 | Shorty | ............ | H04L 12/2838 |
| 9,730,300 B2* | 8/2017 | Chow | ............ | H05B 47/19 |
| 9,933,778 B2* | 4/2018 | Hamann | ............ | C02F 1/008 |
| 9,954,692 B2* | 4/2018 | Brandt | ............ | H04W 24/02 |
| 10,113,287 B2* | 10/2018 | Christiansen | ............ | E02B 5/082 |
| 10,188,050 B2* | 1/2019 | Walker | ............ | A01G 25/16 |
| 10,228,711 B2* | 3/2019 | Woytowitz | ............ | G05F 1/12 |
| 10,241,488 B2* | 3/2019 | Bermudez Rodriguez | ............ | G05B 19/042 |
| 10,327,397 B2* | 6/2019 | Olive-Chahinian | ... | A01G 25/16 |
| 10,359,788 B2* | 7/2019 | Gutierrez | ............ | G05B 19/042 |
| 10,425,248 B2* | 9/2019 | Tulliano | ............ | H04L 12/283 |
| 10,512,227 B2* | 12/2019 | Rainone | ............ | G05B 19/0428 |
| 10,542,684 B2* | 1/2020 | Pearson | ............ | A01G 25/16 |
| 10,637,724 B2* | 4/2020 | Johnson | ............ | H04L 41/0803 |
| 10,999,724 B2* | 5/2021 | Panje | ............ | H04L 12/281 |
| 11,053,652 B2* | 7/2021 | Christiansen | ............ | H01F 7/1877 |
| 11,128,710 B2* | 9/2021 | Binder | ............ | H04L 67/12 |
| 2003/0179102 A1* | 9/2003 | Barnes | ............ | G05B 19/042 340/870.07 |
| 2006/0116102 A1 | 6/2006 | Brown et al. | | |
| 2006/0142875 A1 | 6/2006 | Keyes, IV et al. | | |
| 2006/0148410 A1 | 7/2006 | Nelson et al. | | |
| 2006/0278281 A1 | 12/2006 | Gynz-Rekowski et al. | | |
| 2008/0119948 A1* | 5/2008 | O'Connor | ............ | G05D 7/0664 700/282 |
| 2009/0010233 A1* | 1/2009 | Pratt, Jr. | ............ | G01D 21/00 370/338 |
| 2009/0099701 A1* | 4/2009 | Li | ............ | A01G 25/16 700/284 |
| 2009/0216345 A1* | 8/2009 | Christfort | ............ | G05B 19/0428 455/39 |
| 2010/0217443 A1 | 8/2010 | Hagler | | |
| 2011/0023977 A1 | 2/2011 | Fong et al. | | |
| 2011/0111700 A1* | 5/2011 | Hackett | ............ | A01G 25/16 455/41.2 |
| 2014/0088893 A1 | 3/2014 | McGuire et al. | | |
| 2014/0256212 A1* | 9/2014 | Agarwal | ............ | A63H 30/00 446/175 |
| 2014/0265328 A1 | 9/2014 | Van Blerk | | |
| 2015/0002185 A1 | 1/2015 | McGuire et al. | | |
| 2015/0047810 A1 | 2/2015 | Yang | | |
| 2015/0147119 A1* | 5/2015 | Christiansen | ............ | H01F 7/1877 405/37 |
| 2016/0000023 A1* | 1/2016 | Hamann | ............ | A01G 25/162 239/542 |
| 2016/0037736 A1* | 2/2016 | Rainone | ............ | G05B 19/0428 700/284 |
| 2016/0322886 A1 | 11/2016 | Brienze, Jr. | | |
| 2017/0038237 A1 | 2/2017 | Chen et al. | | |
| 2017/0064606 A1 | 3/2017 | Lam et al. | | |
| 2017/0223128 A1* | 8/2017 | Shuvaev | ............ | H04L 67/125 |
| 2017/0311159 A1* | 10/2017 | Tulliano | ............ | H04L 67/02 |
| 2017/0318761 A1* | 11/2017 | Rainone | ............ | B05B 12/04 |
| 2018/0042188 A1 | 2/2018 | Khabbaz et al. | | |
| 2018/0228099 A1* | 8/2018 | Nickerson | ............ | A01G 25/16 |
| 2018/0343685 A1 | 11/2018 | Hart et al. | | |
| 2019/0032294 A1* | 1/2019 | Christiansen | ............ | H01F 7/1844 |
| 2019/0068489 A1* | 2/2019 | Shekhar | ............ | H04L 47/32 |
| 2019/0110415 A1* | 4/2019 | Walker | ............ | G05B 13/021 |
| 2019/0261584 A1* | 8/2019 | Olive-Chahinian | ... | A01G 25/16 |
| 2019/0373435 A1* | 12/2019 | Panje | ............ | H04W 4/80 |
| 2020/0320860 A1* | 10/2020 | Lafian | ............ | H01F 7/08 |
| 2021/0307264 A1* | 10/2021 | Gilliam | ............ | A01G 25/167 |
| 2021/0309539 A1* | 10/2021 | Budampati | ............ | H04L 67/30 |
| 2022/0132757 A1* | 5/2022 | Woytowitz | ............ | A01G 25/162 700/284 |

* cited by examiner

ETHERNET DECODER IRRIGATION CONTROL SYSTEM

CROSS-REFERENCE TO RELATED APPLICATIONS

This application is a divisional application of U.S. patent application Ser. No. 16/177,590, filed Nov. 1, 2018, which claims the benefit of U.S. Provisional Patent Application Nos. 62/580,685, filed Nov. 2, 2017 and 62/580,753, also filed Nov. 2, 2017, the entire disclosures of each of which are herein incorporated by reference.

BACKGROUND OF THE INVENTION

Field of the Invention

The present invention relates to irrigation systems and, more particularly, to controlling irrigation of one or more desired areas.

Description of Related Art

Irrigation systems used, for example, for watering lawns, include a water distribution means, such as, without limitation, a sprinkler head or a drip irrigation pipe, for delivering water to a desired area from one or more pipes coupled to a water source.

To control the supply of water to one or more sections of the pipes, an electrically actuated water valve is disposed in the pipe section upstream of the water distribution means of said one or more section of the pipes. In response to the water valve being closed, water is prevented from flowing from the water source, e.g., a main water line, to the water distribution means downstream of said valve. In contrast, when the valve is in an open state, water can pass from the water source to the water distribution means which, in response, distributes the water supplied thereto in a manner known in the art.

A typical irrigation system includes a controller coupled in communication with one or more valves of the irrigation system for controlling the open and closed states thereof. The controller can be hardwired to each valve via one or more wires. For example, each valve can be coupled to the controller via two wires which can supply power and ground to the valve. In another example, a number of valves in an area to be irrigated can be coupled to a common ground or earth ground and a single wire can be coupled from each valve to the controller which can supply power to said valve when it is desired to turn the valve to an open state or to withhold power from said valve when it is desired to have the valve be in a closed state.

In another example of a prior art irrigation system, the wired connection described above can be replaced by a wireless connection. In this example, the controller can include at least a transmitter which communicates wirelessly with a receiver which can be coupled to one or more water valves and which is operative for controlling the open and closed state of each valve based on a wireless, radio signal received from the transmitter.

One feature common of prior art irrigation control systems is that the controller needs to be in close proximity to the valves being controlled.

To monitor the amount of water for performance verification, leak detection and water consumption required of today's smart control systems, a flow sensor can be installed downstream of the water source and upstream of the irrigation control valve(s).

To retrofit existing irrigation systems with flow sensors is often not practical since the water source is typically some distance away from the irrigation controller separated by, for example, hardscape, driveways, or great distances. A radio system at the sensor requires power for the radio and the sensor to operate. Often times a permanent source of mains power is not available and solar power is not feasible.

SUMMARY OF THE INVENTION

Generally, provided is a system and method for controlling irrigation of one or more areas.

In one non-limiting embodiment or example, disclosed herein is a flow system comprising: a fluid delivery pipe connected in series between a fluid distributor and a fluid valve, e.g., a water valve, that is connected in series between a source of fluid, e.g., a water source, and the fluid distributor; a flow sensor mounted to the fluid delivery pipe between the fluid valve and the fluid distributor, said flow sensor operative for sensing a flow of fluid in said fluid delivery pipe and for outputting a flow signal in response to the flow of fluid in said fluid delivery pipe; a shunt fluid delivery pipe coupled in parallel with a portion of the fluid delivery pipe; a hydrogenerator mounted to the shunt fluid delivery pipe, said hydrogenerator operative for generating electrical power in response to fluid flowing in the shunt fluid delivery pipe; an electrical storage device coupled to receive and store electrical power generated by the hydrogenerator; and a first radio coupled to receive electrical power from the electrical storage device, to receive the flow signal from the flow sensor, and operative to output a first wireless signal including the flow signal.

In one non-limiting embodiment or example, disclosed herein is a flow system comprising: a fluid delivery pipe connected in series between a fluid distributor and a fluid valve that is connected in series between a source of fluid and the fluid distributor; a controller programmed or configured to control the fluid value via a communication network; and a decoder coupled between the fluid valve and the communication network, said decoder responsive to a command received from the controller via the communication network for changing a state of the fluid valve.

In one non-limiting embodiment or example, disclosed herein is a method comprising: (a) assigning a unique communication network address to a decoder coupled to a water valve; (b) issuing, by a controller to the decoder via a communication network, a command signal to the communication network address of the decoder; and (c) responsive to receiving the command signal, the decoder causing the irrigation valve to change from a close state to an open state, or vice versa.

BRIEF DESCRIPTION OF THE DRAWINGS

These and other features of the present invention will become more apparent from the following description in which reference is made to the appended drawings wherein.

DESCRIPTION OF THE INVENTION

The following examples will be described with reference to the accompanying figures where like reference numbers correspond to like or functionally equivalent elements. It is to be understood that the specific example(s) illustrated in the attached drawings, and described in the following specification, are simply exemplary examples or aspects of the invention. Hence, the specific examples or aspects disclosed herein are not to be construed as limiting.

Figure 1:
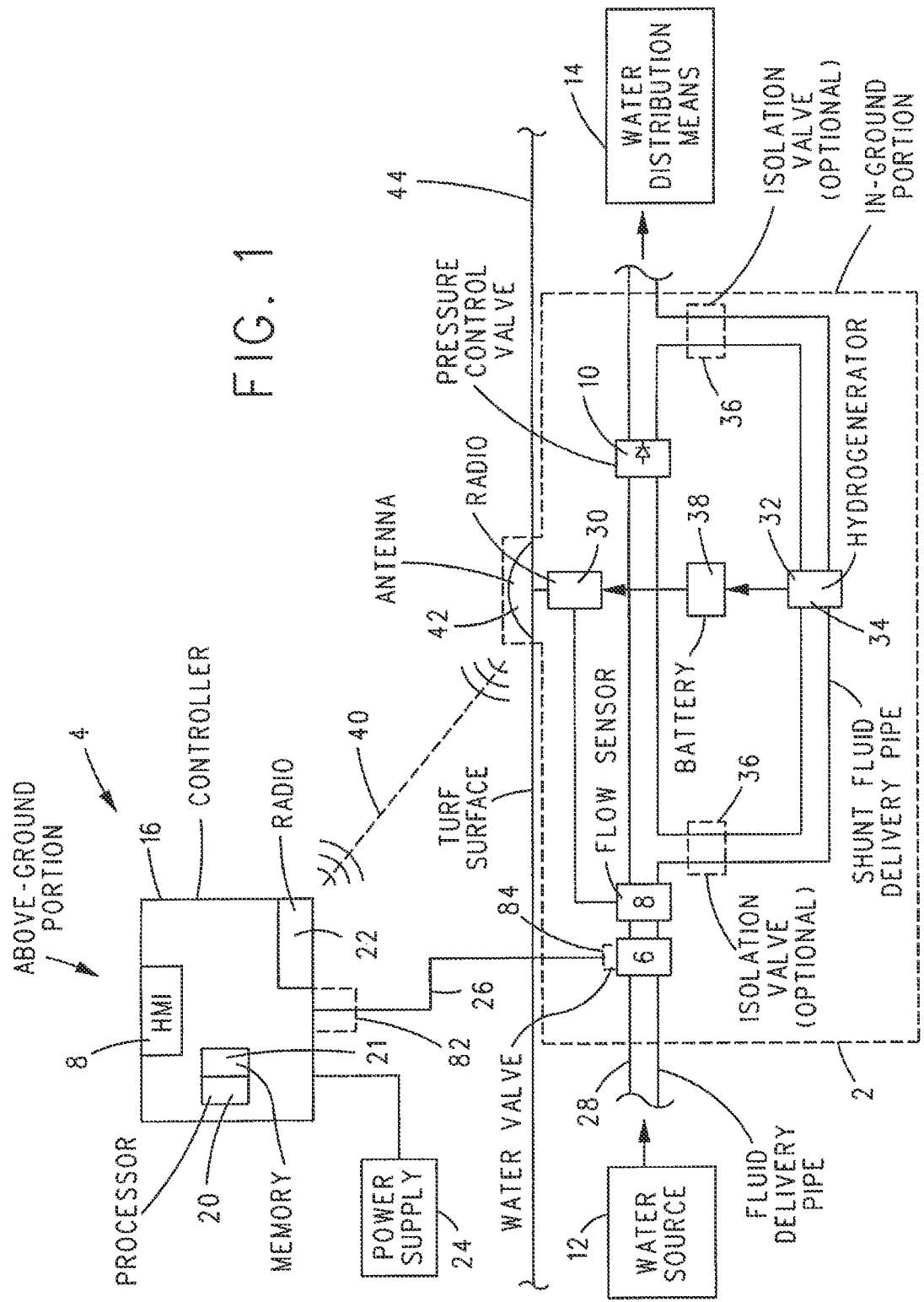
FIG. 1 is a schematic view of a flow system according the principles of the present invention.

With reference to FIG. 1, in one non-limiting embodiment or example, a flow system which can be used for irrigation can include an in-ground portion 2 and an above-ground portion 4. In-ground portion 2 can include a water valve 6 (or fluid valve), a flow sensor 8, and a pressure control valve 10 connected in series between a water source 12 and one or more water distribution means 14, such as, without limitation, a sprinkler head or a drip irrigation pipe. Above-ground portion 4 can include controller 16 that, in-turn, can include a human machine interface (HMI) 18, a processor 20, a memory 21 coupled to processor 20, and a radio 22, all powered by a power supply 24.

In one non-limiting embodiment or example, water valve 6 can be controllable under the control of processor 20 of controller 16 between an open state, where water can pass from water source 12 to water distribution means 14, and a closed state, where the flow of water from water source 12 to water distribution means 14 is blocked, prevented, or avoided. The operative connection between controller 16 and water valve 6 can be via a communication channel 26 which can be a wired connection, a wireless connection, or the combination of a wired and wireless connection. Where communication channel 26 is a wireless connection, controller 16 can include or be connected to an optional radio transmitter or transceiver 82 and water valve 6 can include or be connected to an optional radio receiver or transceiver 84 that enable the open and closed states of water valve 6 to be controlled by controller 16 wirelessly. In an example, radio transmitter or transceiver 82 can be part of communication channel 26, or controller 16, or both. In an example, radio receiver or transceiver 84 can be part of communication channel 26, or in-ground portion 2, or both.

Referring to in-ground portion 2, in one non-limiting embodiment or example, water valve 6, flow sensor 8, and pressure control valve 10 can be connected in series with a fluid delivery pipe 28 which can be used for delivering water from water source 12 to water distribution means 14. Pressure control valve 10 can operate in a manner known in the art to maintain a pressure differential such that water is forced through a shunt fluid delivery pipe 32 (described in greater detail hereinafter) parallel to fluid delivery pipe 28. Flow sensor 8 can be operative for sensing a flow of fluid in fluid delivery pipe 28 and for outputting to a radio 30 of in-ground portion 2 a flow signal in response to the flow of fluid in fluid delivery pipe 28. This flow signal can include an indication that fluid is flowing through flow sensor 8, an indication of the volume of fluid flowing through flow sensor 8, or both. In an example, radio 30 can be a transmitter or a transceiver.

In one non-limiting embodiment or example, in-ground portion 2 can also include shunt fluid delivery pipe 32 coupled in parallel with a portion of fluid delivery pipe 28. A hydrogenerator 34 can be coupled in series with shunt fluid delivery pipe 32. Hydrogenerator 34 can be operative for generating electrical power in response to fluid flowing in shunt fluid delivery pipe 32 and through hydrogenerator 34. The ends of shunt fluid delivery pipe 32 coupled to fluid delivery pipe 28 can include optional isolation valves 36 which can be set to a closed state to allow accessing hydrogenerator 34, e.g., for servicing.

In one non-limiting embodiment or example, the output of hydrogenerator 34 can be coupled to an electrical storage device 38, such as a battery, a capacitor, or any other suitable and/or desirable electrical energy storage device. For the purpose of this description, electrical storage device 38 will be described as being a battery 38. However, this is not to be construed in a limiting sense.

In one non-limiting embodiment or example, radio 30 can be powered from the output of battery 38 in a manner known in the art. Radio 30 can be configured whereupon, in response to receiving the flow signal from flow sensor 8, radio 30 can output via an antenna 42 of in-ground portion 2, a wireless signal 40 that can include the flow signal thereon. In an example, the flow signal output by flow sensor 8 can be modulated on wireless signal 40.

In one non-limiting embodiment or example, radio 22 of controller 16 can be operative for receiving wireless signal 40 output by radio 30 and for retrieving therefrom the flow signal. In an example, radio 22 can be a receiver or a transceiver. Processor 20 of controller 16 can be operative for processing the flow signal. In an example, processor 20 operating under the control of a control program stored in memory 21 can be operative for processing the flow signal to determine an amount (volume) of water passing through flow sensor 8 in a particular period of time. In an example, memory 21 can be programmed with a reference volume or range of volumes of water to pass through flow sensor 8 during a particular period of time.

In one non-limiting embodiment or example, suppose that memory 21 is programmed with a value of "X" volume of water desired to flow through flow sensor 8 during a particular irrigation event. When the irrigation event is started by controller 16 causing water valve 6 to move from a closed state to an open state thereby allowing water to pass from water source 12 to water distribution means 14, flow sensor 8 can output a flow signal representing the volume of water flowing therethrough. This flow signal can be received by processor 20 via wireless signal 40 and can be integrated over time to determine the total amount of water passing through flow sensor 8 during the irrigation event.

In one non-limiting embodiment or example, upon processor 20 determining that the total volume of water passing through flow sensor 8 during the irrigation event is greater than or equal to the desired "X" volume of water programmed into memory 28, processor 20 can, via communication channel 26, cause water valve 12 to return to the closed state, thereby terminating the flow of water to water distribution means 14.

In one non-limiting embodiment or example, during the time that water flows to water distribution means 14 during an irrigation event, a portion of said water passes through shunt fluid delivery pipe 32 thereby powering hydrogenerator 34 which, in a manner known in the art, can output electrical power which can be stored in battery 38. In a manner known in the art, battery 38 can, in-turn, provide electrical power to radio 30 for the operation thereof. In this manner, the act of supplying water to water distribution means 14 via fluid delivery pipe 28 can be used to charge battery 38 which can, in-turn, be used to power radio 30 for transmission of the flow signal to controller 16 in the manner discussed above.

In one non-limiting embodiment or example, only antenna 42 may be above the top of a turf surface 44, with the remainder of in-ground portion 2 being below turf surface 44. However, this is not to be construed in a limiting sense since it is envisioned that antenna 42 can also be positioned below turf surface 44.

Figure 2:
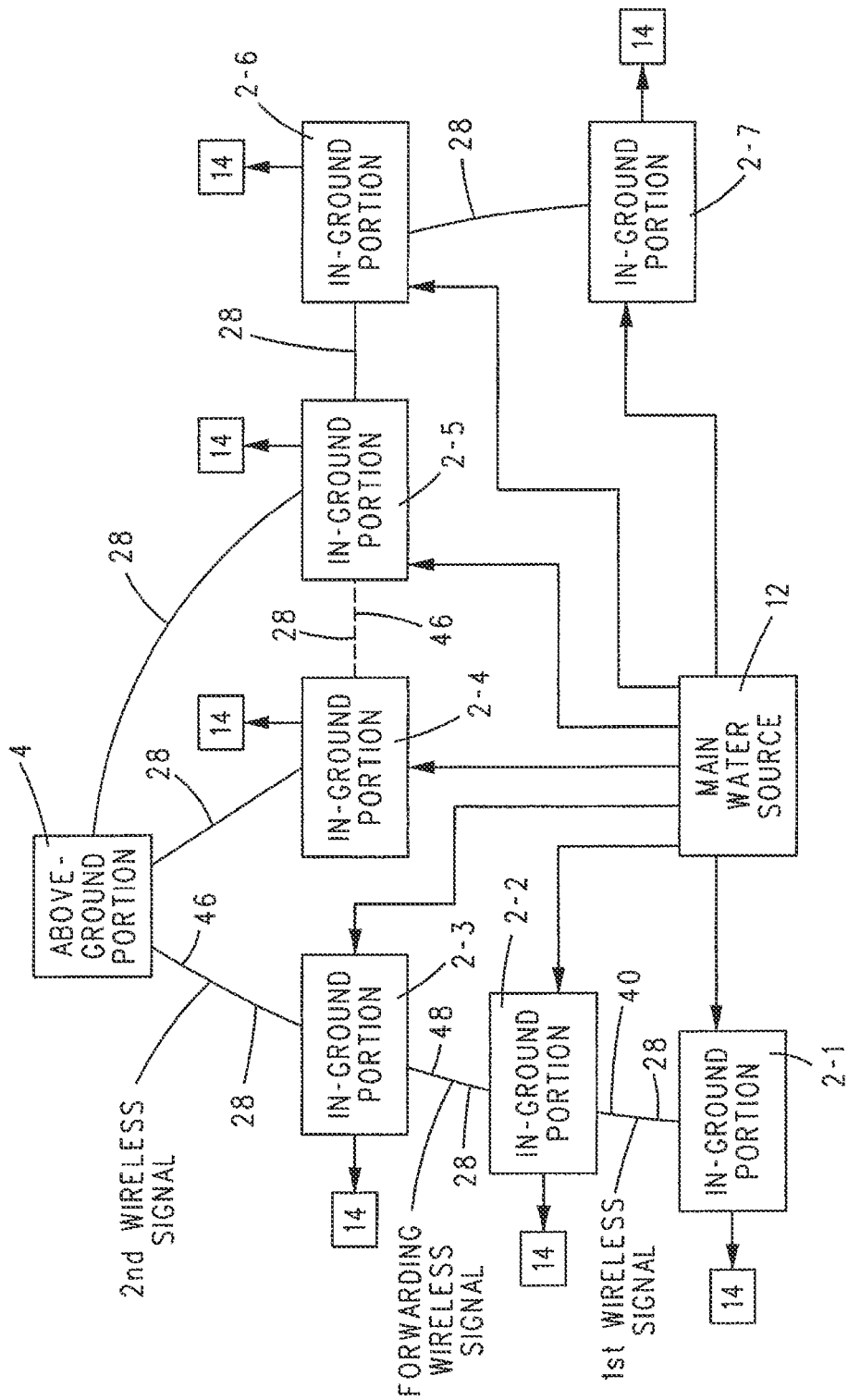
FIG. 2 is a schematic view of a flow system network according the principles of the present invention.

With reference to FIG. 2 and with continuing reference to FIG. 1, in one non-limiting embodiment or example, it is envisioned that above-ground portion 4 can service a number of in-ground portions 2-1-2-7, each of which can similar to in-ground portion 2 in FIG. 1. In an example, each in-ground portion 2 in FIG. 2 can communicate directly with above-ground portion 4, as shown in FIG. 1 and as is also shown by in-ground portion 2-4 in direct communication with above-ground portion 4. In another example, a number of in-ground portions 2 can be configured and operative as a wireless network, e.g., a wireless mesh network, wherein the radio 30 of each in-ground portion acts as a node of the network.

In one non-limiting embodiment or example, as shown in FIG. 2, the radios 30 of in-ground portions 2-1-2-7 in radio communication range with each other can form communication channels 28 therebetween. In another example, one or more communication channels 28 can be formed with the radio 22 of controller 16 of above-ground portion 4 by one or more radios 30 in in-ground portions 2 within radio range of radio 22.

In one non-limiting embodiment or example of a mesh network, the flow signal from in-ground portion 2-1 can be received by above-ground portion 4 via in-ground portions 2-2 and 2-3. Similarly, the flow signal output by in-ground portion 2-2 can be received by above-ground portion 4 via in-ground portion 2-3 which can communicate directly with above-ground portion 4. In another example, the flow signal output by in-ground portion 2-7 can be received by above-ground portion 4 via in-ground portions 2-6 and 2-5. Similarly, the flow signal output by in-ground portion 2-6 can be received by above-ground portion 4 via in-ground portion 2-5.

In one non-limiting embodiment or example, suppose in-ground portion 2-5 falls out of wireless communication with above-ground portion 4, e.g., through the presence of atmospheric events and/or physical objects. In this example, the mesh network can be reconfigured or can automatically reconfigure itself, whereupon instead of communicating flow signals directly to above-ground portion 4, in-ground portion 2-4 can be added to the mesh comprising in-ground portions 2-5-2-7, whereupon flow signals from one or more of in-ground portions 2-5-2-7 can be received by above-ground portion 4 via in-ground portion 2-4. In an example, it is envisioned that the mesh network can be automatically and dynamically configurable in a manner known in the art in order to provide a pathway for the flow signal output by each in-ground portion 2-1-2-7 to above-ground portion 4.

In one non-limiting embodiment or example, the radio 30 of each in-ground portion, e.g., 2-2 and 2-3, that acts as a pathway to radio 22 of controller 16 of above-ground portion, can be a transceiver that is operative to receive a flow signal from a downstream in-ground portion 2 and to forward said flow signal to an upstream in-ground portion 2 (when not in direct communication with the above-ground portion) or directly to above-ground portion 4 (when in direct communication with the above-ground portion).

In one non-limiting embodiment or example, above-ground portion 4 can include radio 22 operative for receiving a second wireless signal 46 that can include a flow signal that can originate at any one of in-ground portion 2-1-2-3 in the mesh network arrangement shown in FIG. 2. The controller 16 of above-ground portion 4 can include processor 20 operative for processing the flow signal received by radio 22 on the second wireless signal 46. In an example, the second wireless signal 46 can include the flow signal originally generated by in-ground portion 2-1 which can be transmitted by radio 30 of in-ground portion 2-3 to radio 22 of above-ground portion 4. In this example, in-ground portion 2-3 is operative to forward said flow signal received wirelessly from in-ground portion 2-2 which acts to forward the flow signal received wirelessly from in-ground portion 2-1 which outputs said flow signal on first wireless signal 40. In this example, the wireless signal output by in-ground portion 2-2 and received by in-ground portion 2-3 can be a forwarding wireless signal 48.

In one non-limiting embodiment or example, the radio 30 of in-ground portion 2-2 receives from in-ground portion 2-1 the first wireless signal 40 that can include the flow signal generated by a water valve 6 of in-ground portion 2-1. The radio 30 of in-ground portion 2-2 wirelessly forwards this flow signal, via the forwarding wireless signal 48, to in-ground portion 2-3 which, in-turn, wirelessly forwards this flow signal to above-ground portion 4 via the second wireless signal 46.

In one non-limiting embodiment or example, based on this flow signal received by above-ground portion 4, the open and closed state of the water valve 6 of in-ground portion 2-1 that generated the flow signal can be controlled via a reverse wireless path from the radio 22 of above-ground portion 4 to the radio 30 of in-ground portion 2-1 via the radios 30 of in-ground portions 2-2 and 2-3.

Figure 3:
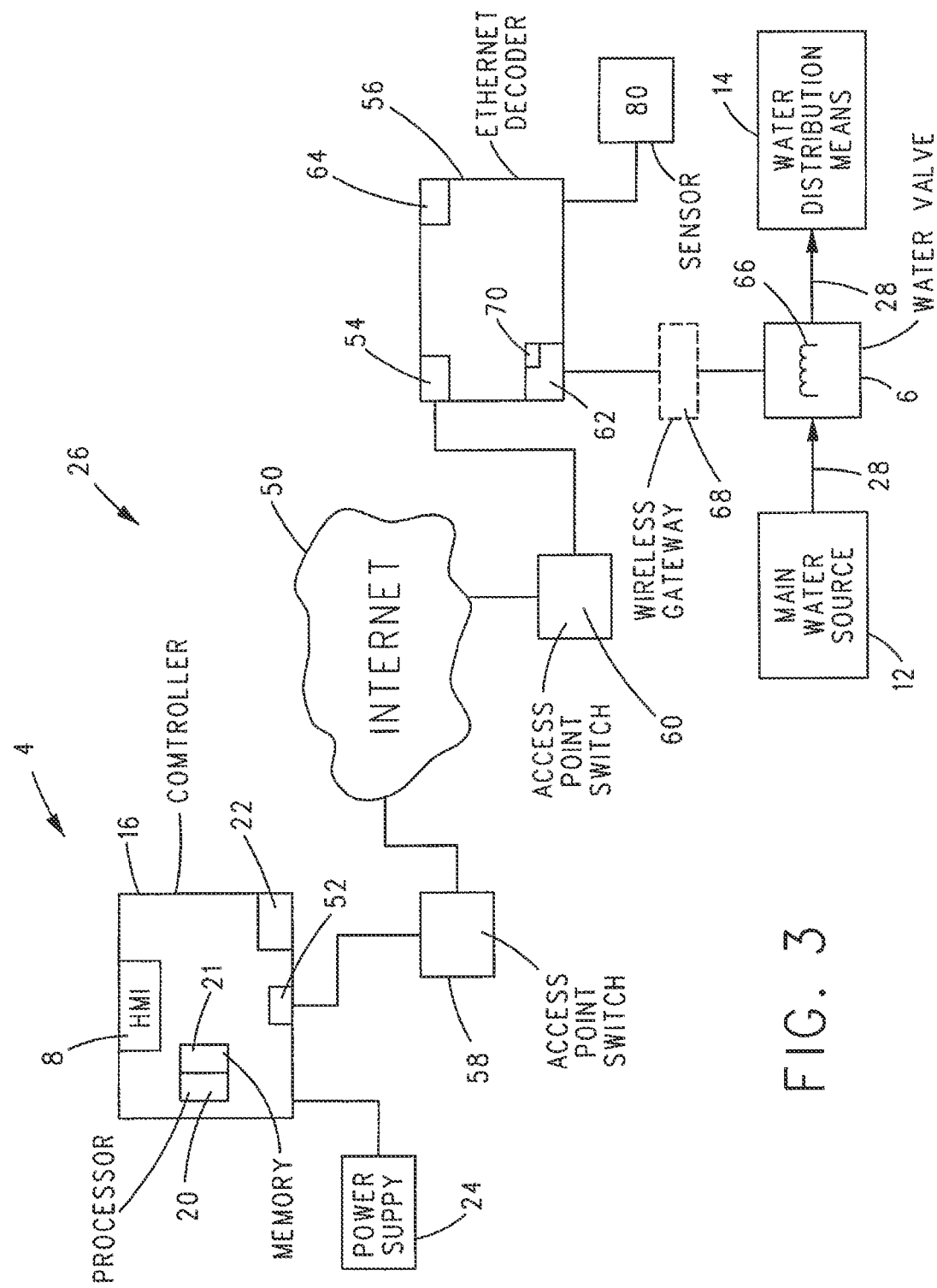
FIG. 3 is a schematic view of a flow system according the principles of the present invention.

With reference to FIG. 3 and with continuing reference to FIG. 1, in one non-limiting embodiment or example, communication channel 26 can include the Internet 50 coupled to an Ethernet port 52 of controller 16. In this example, radio 22 can be optional.

In one non-limiting embodiment or example, connected to Internet 50 remote from controller 16 can be an Ethernet port 54 of an Ethernet decoder 56. The connection between Internet 50 and Ethernet port 52, Ethernet port 54, or both can each be by a wired network (shown) or a wireless network (not shown). The manner in which each Ethernet port 52 and 54 communicates with Internet 50 is not to be construed in a limiting sense.

Herein, "Ethernet" is used as a specific example of a communication protocol and is not to be construed in a limiting sense as it is envisioned that any suitable and/or desirable communication protocol now known or hereinafter developed may be used instead.

In one non-limiting embodiment or example, the network connection between Ethernet port 52 and Internet 50 can be via an optional access point switch 58. Similarly, the network communication between Internet 50 and Ethernet port 54 can be via an optional access point switch 60. In an example, the Ethernet protocol can be used for communication with Ethernet ports 52 and 54. However, this is not to be construed in a limiting sense since it is envisioned that other wired or wireless communication protocol(s) can be utilized.

In one non-limiting embodiment or example, in FIG. 3, other elements, such as modems, routers, and the like, normally used for communication between controller 16 and Ethernet decoder 56 are not shown for the purpose of simplicity. It is, however, to be understood, that such other elements are present as necessary to facilitate wired and/or wireless network communication between controller 16 and Ethernet decoder 56.

In one non-limiting embodiment or example, water valve 6 can be coupled to a powered relay 62 of or accessible by Ethernet decoder 58 via a wired and/or wireless connection. In an example, the open and closed states of irrigation valve 4 can be controlled in response to receiving appropriate control signals from powered relay 62 via the wired and/or a wireless connection.

In one non-limiting embodiment or example, Ethernet decoder 56 can control the open and closed states of one or more water valves 6 positioned in an irrigation area and coupled to Ethernet decoder 56 via one or more wired and/or wireless connections. In an example, Ethernet decoder 56 can be processor 64 based. An example of how the system of FIG. 3 can be utilized will now be described with reference to controlling a single water valve 6. However, this is not to be construed in a limiting sense.

In one non-limiting embodiment or example, starting with water valve 6 in a closed state blocking the flow of water from water source 12 to a water distribution means 14, processor 20 of controller 16, operating under the control of a control program stored in memory 21 of controller 16, can output to the IP or network address assigned to Ethernet decoder 58 an "open" command to open water valve 6. In a manner known in the art, this "open" command travels from Ethernet port 52 via Internet 50 to Ethernet port 54 of Ethernet decoder 56.

In one non-limiting embodiment or example, in response to receiving this "open" command, Ethernet decoder 56 water causes water valve 6 to change from the closed state to an open state thereby allowing water to pass from water source 12 to water distribution means 14. In an example, where Ethernet decoder 56 is hardwired to water valve 4, powered relay 62 can be configured to directly supply electrical power to an energizing coil 66 to place water valve 6 in an open state.

In one non-limiting embodiment or example, where Ethernet decoder 56 is wirelessly connected to water valve 6, an optional wireless gateway 68, such as a Tucor Nexus Base Wireless Gateway, available from Tucor, Inc. of Harmony, Pennsylvania, can be provided in wireless communication with powered relay 62 via a wireless transmitter 70 or wireless transceiver of or accessible by Ethernet decoder 56. In an example, wireless gateway 68 can be hardwired to water valve 6. In an example, in response to Ethernet decoder 56 outputting via wireless transmitter 70 a wireless command corresponding to the "open" command received by Ethernet decoder 56, wireless gateway 68 can cause electrical power to be supplied to a coil 66 of water valve 6 that causes water valve 6 to move to an open state thereby allowing water to pass from water source 12 to water distribution means 14.

Figure 4:
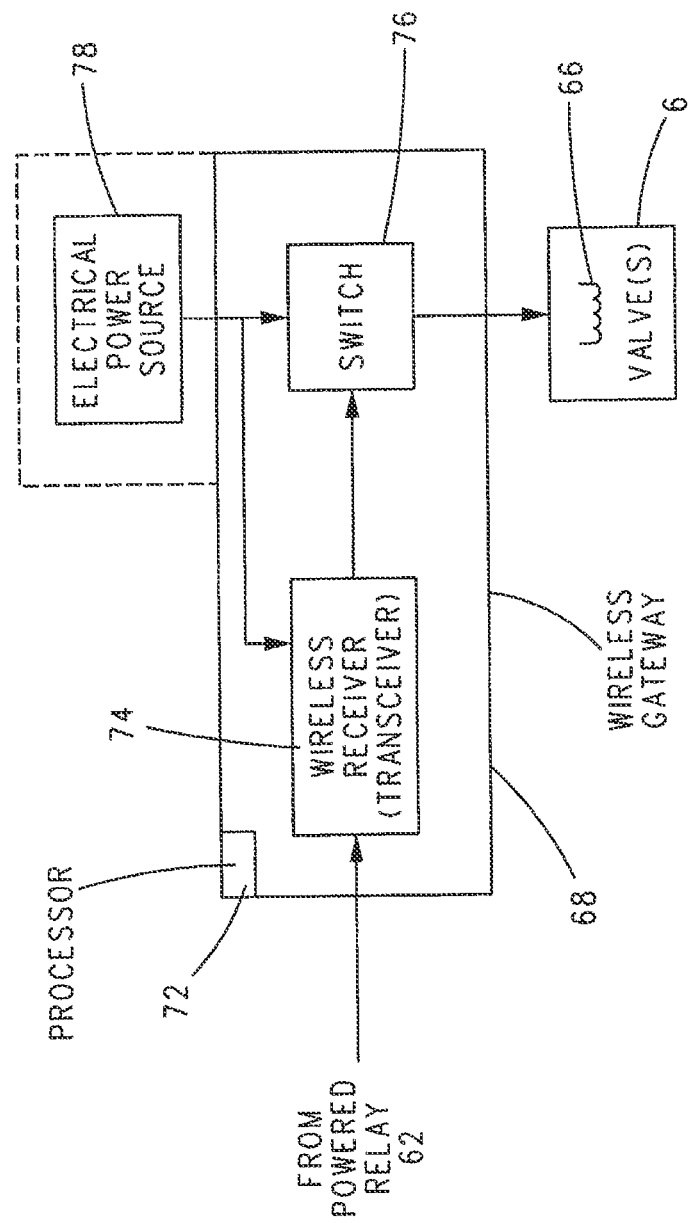
FIG. 4 is a schematic of a wireless gateway of FIG. 3 according the principles of the present invention.

With reference to FIG. 4 and with continuing reference to FIG. 3, in one non-limiting embodiment or example, wireless gateway 68 can be processor 72 based and can include at least a wireless receiver 74 or transceiver for receiving wireless command from wireless transmitter 70. In response to wireless transmitter 70 outputting the wireless command corresponding to the "open" command received by Ethernet decoder 56, a switch 76, under the control of processor 72, can connect coil 66 to an electrical power source 78, such as, without limitation, power over Ethernet (POE), a battery, a solar call, or a permanent source of electrical power (such as utility power). In response to connecting coil 66 to electrical power source 78, water valve 6 moves to an open state.

In one non-limiting embodiment or example, when it is desired to change water valve 6 back to the closed state, controller 2 can output a "close" command signal to the IP or network address assigned to Ethernet decoder 56. In a manner known in the art, this "close" command travels from Ethernet port 52 via the Internet 50 to Ethernet port 54 of Ethernet decoder 56.

In one non-limiting embodiment or example, in response to receiving the "close" command, Ethernet decoder 56 causes water valve 6 to change from the open state to the closed state thereby blocking the flow of water from water source 12 to water distribution means 14. In an example, where Ethernet decoder 56 is hardwired to water valve 6, powered relay 62 can be configured to directly withhold electrical power from coil 66 to main water valve 6 in the closed state.

In one non-limiting embodiment or example, where Ethernet decoder 56 is wirelessly connected to water valve 6 via wireless gateway 68, in response to wireless transmitter 70 outputting the wireless command corresponding to the "close" command received by Ethernet decoder 56, switch 76, under the control of processor 72, can disconnect coil 66 from electrical power source 78, whereupon water valve 6 is configured to return to the closed state.

In one non-limiting embodiment or example, as can be seen, the open and closed states of water valve 6 can be remotely controlled by controller 16 via the IP or network address assigned to Ethernet decoder 56. In an example, the open and closed state of each water valve 6 coupled (hardwired or wirelessly) to Ethernet decoder 56 can be controlled in concert or independently of other water valves 4 coupled to Ethernet decoder 56.

In one non-limiting embodiment or example, controller 16 can be located anywhere remote from Ethernet decoder 56. In an example, provided controller 16 can communicate with Ethernet decoder 56 via Internet 50, controller 16 and Ethernet decoder 56 can be positioned any distance apart deemed suitable and/or desirable by one of ordinary skill in the art.

In one non-limiting embodiment or example, controller 16 can be programmed with IP or network addresses of a number of Ethernet decoders 56 (not shown), each of which can control the open and closed state of one or more water valves 6 coupled thereto (hardwired or wirelessly) and positioned in the same irrigation area or in different irrigation areas positioned any distance apart. In an example, controller 16 can control the open and closed states of any number of water valves 4, individually or in concert, regardless of their location or proximity to each other. An advantage is that controller 16, instead of being dedicated to controlling water valve(s) 4 in one or more proximate or adjacent irrigation areas, can control water valve(s) 4 in irrigation areas separated by vast distances from each other provided an Internet 50 connection can be established between controller 16 and the one or more Ethernet decoders 56 controlling said one or more water valves 6.

In the above example, powered relay 62 and/or wireless transmitter 70 and, hence, Ethernet decoder 56 is described as controlling the open and closed state of a single water value 6. However, this is not to be construed in a limiting sense since it is envisioned that Ethernet decoder 56 can be configured to control the open and closed states of multiple water values 6. In an example, powered relay 62 can represent any number of control ports of Ethernet decoder 56 as may be required for an application.

In one non-limiting embodiment or example, while the foregoing described "open" and "close" command signals being communicated from controller 16 to Ethernet decoder 56, it is also envisioned Ethernet decoder 56 can communicate back to controller 2. For example, upon receiving an "open" or "close" command signal, Ethernet decoder 56 can return an appropriate acknowledgement signal to controller 16.

In one non-limiting embodiment or example, the output of one or more sensors 80 can be coupled to Ethernet decoder 56 which, in-turn, can communicate the output of each sensor 80 to controller 16 for analysis via Ethernet ports 52 and 54, and Internet 50. In an example, each sensor 80 can be a rainfall sensor, a moisture sensor, or the combination thereof. Based on the analysis of the output of said one or more sensors 80, controller 16 can control the open and closed state of each water valve 6 capable of being controlled by controller 16 in the manner described above to irrigate one or more irrigation areas to a desired extent, thereby avoiding over- or under-irrigating said one or more irrigation areas.

In one non-limiting embodiment or example, water valve 6 shown FIGS. 3-4 can be a standalone water valve or a water valve of in-ground portion 2 shown in FIGS. 1-2 that can also include flow sensor 8, pressure control valve 10, fluid delivery pipe 28, shunt fluid delivery pipe 32, hydrogenerator 34, battery 38, radio 30, and antenna 42.

In one non-limiting embodiment or example, the example of FIGS. 3-4 was described as having Ethernet ports 52 and 54, and Ethernet decoder 56. However, this is not to be construed in a limiting sense since it is envision that ports 52 and 54 and decoder 56 can implement any suitable and/or desirable are network protocol (other than the Ethernet protocol) now known or hereinafter developed.

As can be seen, disclosed herein is a wireless flow system comprising: a fluid delivery pipe 28 connected in series between one or more water distribution means 14 and a water valve 6 that is connected in series between a water source 12 and the water distribution means 14. A flow sensor 8 can be mounted to the fluid delivery pipe 28 between the water valve 6 and the water distribution means 14. The flow sensor 8 can be operative for sensing a flow of fluid in said fluid delivery pipe 28 and for outputting a flow signal in response to the flow of fluid in said fluid delivery pipe 28. A shunt fluid delivery pipe 32 can be coupled in parallel with a portion of the fluid delivery pipe 28. A hydrogenerator 34 can be mounted to the shunt fluid delivery pipe 28. The hydrogenerator 34 can be operative for generating electrical power in response to fluid flowing in the shunt fluid delivery pipe 32. An electrical storage device 38 can be coupled to receive and store electrical power generated by the hydrogenerator 34. A first radio 30 can be coupled to receive electrical power from the electrical storage device 38, to receive the flow signal from the flow sensor 8, and for outputting a first wireless signal 40 including the flow signal. In an example, the flow signal can be modulated on first wireless signal 40.

The wireless flow system can include a controller 16 that can include a second radio 22 operative for receiving the first wireless signal 40 output by the first radio 30 and for retrieving or demodulating the flow signal from the first wireless signal 40. The controller 16 can also include a processor operative for processing the flow signal.

The wireless flow system can further include controller 16 including second radio 22 operative for receiving a second wireless signal that can include the flow signal and for retrieving or demodulating therefrom the flow signal. The controller 16 can include a processor operative for processing the flow signal. In this example, one or more forwarding radios 30 can be used to forward the flow signal included on a first wireless signal output by the first radio 30 to the second radio 22.

The wireless flow system can include controller 16 including second radio 22 operative for receiving a second wireless signal that can include the flow signal and for retrieving therefrom the flow signal, and a processor 20 operative for processing the flow signal. On or more third radios 2-2 and/or 2-3 can be operative for generating the second wireless signal in response to the first wireless signal.

In this example, the third radio can be operative for generating the second wireless signal in response to the first wireless signal when the first and second radios are not in direct wireless communication with each other.

The shunt fluid delivery pipe can be coupled in parallel with the portion of the fluid delivery pipe downstream of the flow sensor.

A pressure control valve can be mounted to the fluid delivery pipe in series with the flow sensor, wherein the shunt fluid delivery pipe can be coupled in parallel with said flow sensor.

The flow signal can include a value of a volume of fluid flowing through the flow sensor.

Also disclosed herein is a method comprising: (a) assigning a unique IP or network address to a network (e.g., Ethernet) decoder operatively coupled to an irrigation valve; (b) issuing, by a controller to the network decoder via a communication network, such as the Internet, a command signal to the IP or network address of the network decoder operatively coupled to the irrigation valve; and (c) responsive to receiving the command signal, the network decoder causing the irrigation valve to change from a close state to an open state, or vice versa.

The network decoder can be coupled to the irrigation valve via a wired and/or wireless connection.

Also disclosed is a flow system comprising: a fluid delivery pipe connected in series between a fluid distributor and a fluid valve that is connected in series between a source of fluid and the fluid distributor; a controller programmed or configured to control the fluid value via a communication network; and a decoder coupled between the fluid valve and the communication network, said decoder responsive to a command received from the controller via the communication network a command for changing a state of the fluid valve.

The decoder can be coupled to the fluid valve via a wired connection, a wireless connection, or both.

The flow system can include a gateway in wireless communication with the decoder, the gateway can be operative for enabling the decoder to control the state of the fluid valve via a wireless command from the decoder to the gateway.

The gateway can be coupled to the fluid valve via a wired connection and/or a wireless connection.

The communication network can include the Internet.

Also disclosed is a method comprising: (a) assigning a unique communication network address to a decoder coupled to an water valve; (b) issuing, by a controller to the decoder via a communication network, a command signal to the communication network address of the decoder; and (c) responsive to receiving the command signal, the decoder causing the irrigation valve to change from a close state to an open state, or vice versa.

The decoder can be coupled to the irrigation valve via a wired and/or wireless connection. The decoder can be an Ethernet decoder. The communication network can include the Internet. The communication network address can be an Internet Protocol address.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that can be within the spirit and scope of the appended claims. For example, it is to be understood that the present invention contemplates that, to the extent possible, one or more features of any embodiment can be combined with one or more features of any other embodiment.

The invention claimed is:

1. A flow system comprising:
a fluid delivery pipe connected in series between a fluid distributor and a fluid valve that is connected in series between a source of fluid and the fluid distributor;
a controller programmed or configured to control the fluid valve via the Internet;
a decoder coupled between the fluid valve and the Internet, said decoder responsive to a command received from the controller via the Internet for changing a state of the fluid valve upon receiving the command; and
a gateway, coupled between the fluid valve and the decoder, in wireless communication with the decoder, the gateway operative for enabling the decoder to directly control the state of the fluid valve via a wireless command from the decoder to the gateway in response to the command received by the decoder from the controller via the Internet.

2. The flow system of claim 1, wherein the decoder is coupled to the fluid valve via a wired connection, a wireless connection, or both.

3. The flow system of claim 1, wherein the gateway is coupled to the fluid valve via a wired connection or a wireless connection.

4. A method comprising: (a) assigning a unique Internet Protocol address to a decoder coupled to an irrigation valve; (b) issuing by a controller to the decoder via the Internet, a command signal to the Internet Protocol address of the decoder; and (c) upon receiving the command signal via the Internet, the decoder, via a gateway coupled between the irrigation valve and the decoder, directly causing the irrigation valve to change from a close state to an open state, or vice versa, based upon the gateway enabling the decoder via a command from the decoder to the gateway.

5. The method of claim 4, wherein the decoder is coupled to the irrigation valve gateway via a wireless connection.

6. The method of claim 5, wherein the gateway is hard-wired to the irrigation valve.

* * * * *